United States Patent
Hui et al.

(10) Patent No.: US 9,113,136 B2
(45) Date of Patent: Aug. 18, 2015

(54) VIDEO PROCESSING APPARATUS AND METHOD FOR SIMULTANEOUSLY DISPLAYING A PLURALITY OF VIDEO SIGNALS ON DISPLAY DEVICE

(75) Inventors: Guangjun Hui, Shenzhen (CN); Deliang Peng, Kunming (CN)

(73) Assignee: MediaTek Singapore Pte. Ltd., Singapore (SG)

( * ) Notice: Subject to any disclaimer, the term of this patent is extended or adjusted under 35 U.S.C. 154(b) by 353 days.

(21) Appl. No.: 13/810,208

(22) PCT Filed: Jul. 15, 2010

(86) PCT No.: PCT/CN2010/075189
§ 371 (c)(1),
(2), (4) Date: Jan. 15, 2013

(87) PCT Pub. No.: WO2012/006786
PCT Pub. Date: Jan. 19, 2012

(65) Prior Publication Data
US 2013/0113989 A1   May 9, 2013

(51) Int. Cl.
*H04N 11/04*   (2006.01)
*H04N 19/00*   (2014.01)
(Continued)

(52) U.S. Cl.
CPC ........... *H04N 19/00* (2013.01); *H04N 5/44591* (2013.01); *H04N 21/4314* (2013.01); *H04N 21/440263* (2013.01); *H04N 21/4622* (2013.01)

(58) Field of Classification Search
CPC .................................. H04N 5/44591
USPC ....................................... 348/385.1
See application file for complete search history.

(56) References Cited

U.S. PATENT DOCUMENTS 5,801,705 A * 9/1998 Kato et al. ..................... 345/419
5,963,200 A * 10/1999 Deering et al. ............... 345/213
(Continued)

FOREIGN PATENT DOCUMENTS

CN   1479251 A   3/2004
CN   1592377 A   3/2005
(Continued)

OTHER PUBLICATIONS

"International Search Report" mailed on Apr. 21, 2011 for International application No. PCT/CN2010/075189, International filed: Jul. 15, 2010.

*Primary Examiner* — Dave Czekaj
*Assistant Examiner* — Leron Beck
(74) *Attorney, Agent, or Firm* — Winston Hsu; Scott Margo

(57) ABSTRACT

A video processing apparatus includes decoding circuit, setting circuit, processing circuit, first buffer, second buffer, and display unit. The decoding circuit generates a plurality of decoded video signals. The setting circuit selects a main decoded video signal and at least one sub-decoded video signal from the decoded video signals. The processing circuit processes main decoded video signal and sub-decoded video signal(s) to generate a processed video signal. Each of these two buffers serves as on-screen buffer for storing the processed video signal being displayed or to be displayed and serves as on-process buffer for storing the processed video signal being mixed or to be mixed, cyclically. The first and second buffers do not serve as on-screen buffer simultaneously, and the first and second buffers do not serve as on-process buffer simultaneously. The display unit cyclically displays the processed video signal read from first buffer and second buffer.

16 Claims, 11 Drawing Sheets

(51) Int. Cl.
*H04N 5/445* (2011.01)
*H04N 21/431* (2011.01)
*H04N 21/4402* (2011.01)
*H04N 21/462* (2011.01)

(56) References Cited

U.S. PATENT DOCUMENTS

| | | | |
|---|---|---|---|
| 6,115,065 A * | 9/2000 | Yadid-Pecht et al. | 348/308 |
| 8,201,104 B2 * | 6/2012 | Yamamoto et al. | 715/835 |
| 2003/0020832 A1 * | 1/2003 | Carlsgaard et al. | 348/565 |
| 2003/0098866 A1 * | 5/2003 | Lee | 345/539 |
| 2005/0018083 A1 * | 1/2005 | Ryou | 348/565 |
| 2005/0111549 A1 * | 5/2005 | Kim et al. | 375/240.12 |
| 2005/0210410 A1 * | 9/2005 | Ohwa et al. | 715/821 |
| 2005/0235335 A1 * | 10/2005 | Morita et al. | 725/133 |
| 2006/0104607 A1 * | 5/2006 | Grigorian | 386/68 |
| 2006/0159184 A1 * | 7/2006 | Jang et al. | 375/240.26 |
| 2008/0055470 A1 * | 3/2008 | Garg et al. | 348/564 |
| 2009/0225224 A1 * | 9/2009 | Sung et al. | 348/565 |
| 2010/0253693 A1 * | 10/2010 | Streatch et al. | 345/548 |
| 2011/0090324 A1 * | 4/2011 | Mentz et al. | 348/55 |
| 2011/0157334 A1 * | 6/2011 | Kim et al. | 348/56 |

FOREIGN PATENT DOCUMENTS

| | | |
|---|---|---|
| CN | 101207749 A | 6/2008 |
| EP | 1 816 862 A1 | 8/2007 |
| TW | 385129 | 3/2000 |
| TW | 200939763 | 9/2009 |
| TW | 201008296 | 2/2010 |
| WO | 2006136989 A1 | 12/2006 |

* cited by examiner

VIDEO PROCESSING APPARATUS AND METHOD FOR SIMULTANEOUSLY DISPLAYING A PLURALITY OF VIDEO SIGNALS ON DISPLAY DEVICE

BACKGROUND OF THE INVENTION

1. Field of the Invention

The disclosed embodiments of the present disclosure relate to displaying video frames, and more particularly, to a video processing apparatus and related method for simultaneously displaying a plurality of video signals on a display device.

2. Description of the Related Art

For a video processing apparatus, such as a television, a conventional double-buffer procedure is usually adopted for processing video signals stored in buffers, wherein one buffer is arranged for storing video signals being displayed or to be displayed and the other buffer is arranged for storing video signals being mixed or to be mixed. Hence, how to control the video processing apparatus, driven using data stored in two buffers, in order to simultaneously display a plurality of video signals on a display device has become an important issue to be solved by designers in this field.

BRIEF SUMMARY OF THE INVENTION

It is one of the objectives of the claimed disclosure to provide a video processing apparatus and related method for simultaneously displaying a plurality of video signals on a display device to solve the above-mentioned problems.

According to an embodiment of the present disclosure, an exemplary video processing apparatus is provided. The exemplary video processing apparatus includes a decoding circuit, a setting circuit, a processing circuit, a first buffer, a second buffer, and a display unit. The decoding circuit is arranged for decoding a plurality of video signals to generate a plurality of decoded video signals. The setting circuit is arranged for selecting a main decoded video signal from the plurality of decoded video signals, and selecting at least one sub-decoded video signal from the other decoded video signals, wherein each of the main decoded video signal and the sub-decoded video signal includes a plurality of frames. The processing circuit is arranged for performing an image processing operation upon the main decoded video signal and the at least one sub-decoded video signal to generate a processed video signal. The first buffer is coupled to the processing circuit, and the first buffer serves as an on-screen buffer for storing the processed video signal being displayed or to be displayed and serves as an on-process buffer for storing the processed video signal being mixed or to be mixed, cyclically. The second buffer is coupled to the processing circuit, and the second buffer serves as the on-process buffer for storing the processed video signal being mixed or to be mixed and serves as the on-screen buffer for storing the processed video signal being displayed or to be displayed, cyclically, wherein the first buffer and the second buffer do not serve as the on-screen buffer simultaneously, and the first buffer and the second buffer do not serve as the on-process buffer simultaneously. The display unit is coupled to the first buffer and the second buffer, for cyclically displaying the processed video signal read from the first buffer and the second buffer on a display device.

According to another embodiment of the present disclosure, an exemplary method for simultaneously displaying a plurality of video signals on a display device is provided. The exemplary method includes the steps of: decoding the plurality of video signals to generate a plurality of decoded video signals; selecting a main decoded video signal from the plurality of decoded video signals, and selecting at least one sub-decoded video signal from the other decoded video signals, wherein each of the main decoded video signal and the sub-decoded video signal includes a plurality of frames; performing an image processing operation upon the main decoded video signal and the at least one sub-decoded video signal to generate a processed video signal; using a first buffer serving as an on-screen buffer for storing the processed video signal being displayed or to be displayed and serving as an on-process buffer for storing the processed video signal being mixed or to be mixed, cyclically; using a second buffer serving as the on-process buffer for storing the processed video signal being mixed or to be mixed and serving as the on-screen buffer for storing the processed video signal being displayed or to be displayed, cyclically, wherein the first buffer and the second buffer do not serve as the on-screen buffer simultaneously, and the first buffer and the second buffer do not serve as the on-process buffer simultaneously; and cyclically displaying the processed video signal read from the first buffer and the second buffer on the display device.

These and other objectives of the present disclosure will no doubt become obvious to those of ordinary skill in the art after reading the following detailed description of the preferred embodiment that is illustrated in the various figures and drawings.

DETAILED DESCRIPTION OF THE INVENTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is coupled to another device, that connection may be through a direct electrical connection, or through an indirect electrical connection via other devices and connections.

Figure 1:
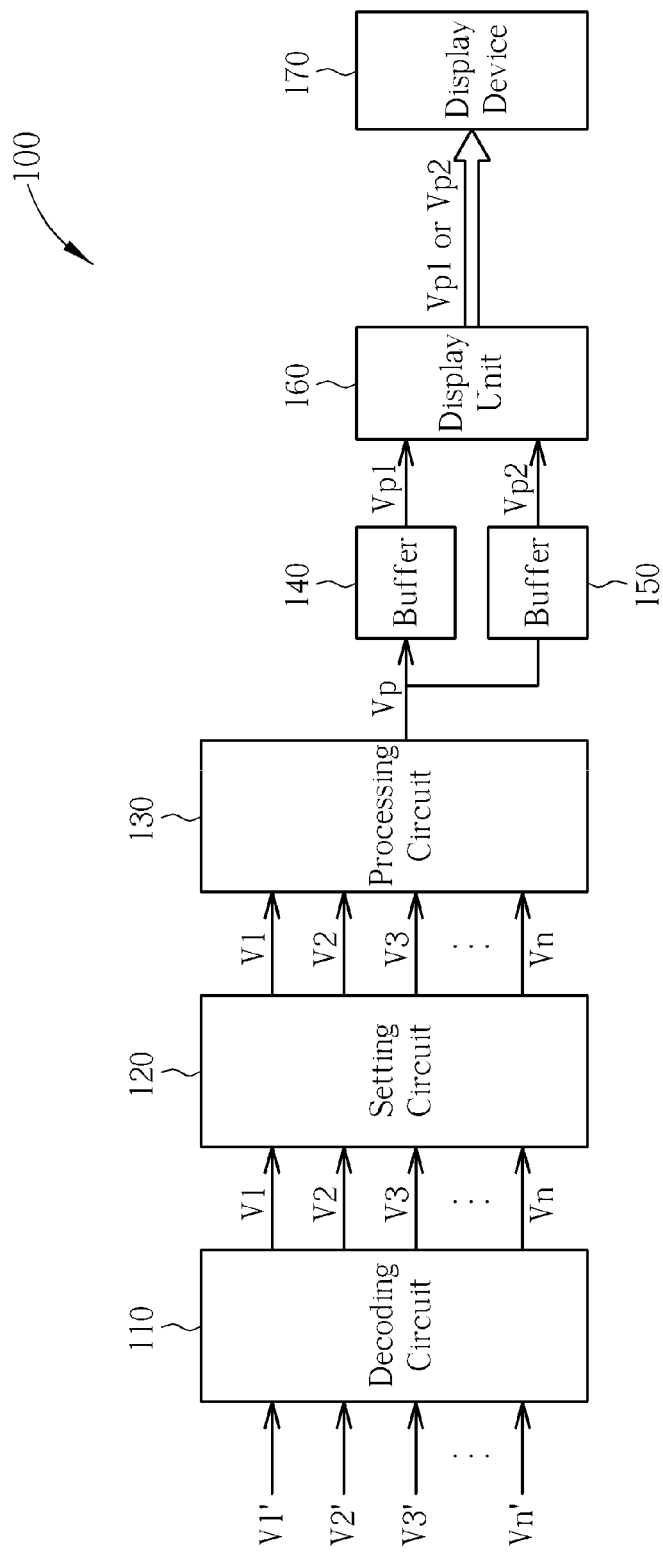
FIG. 1 is a block diagram illustrating an exemplary architecture of a video processing apparatus according to an embodiment of the present disclosure.

FIG. 1 is a block diagram illustrating an exemplary architecture of a video processing apparatus 100 according to a first embodiment of the present disclosure. As shown, the video processing apparatus 100 includes, but is not limited to, a decoding circuit 110, a setting circuit 120, a processing circuit 130, a plurality of buffers such as buffers 140 and 150, a display unit 160, and a display device (e.g., a display panel) 170. The decoding circuit 110 is arranged for decoding a plurality of video signals V1'~Vn' to generate a plurality of decoded video signals V1~Vn. The setting circuit 120 is coupled to the decoding circuit 110, and arranged for selecting a main decoded video signal from the plurality of decoded video signals V1~Vn, and selecting at least one sub-decoded video signal from the other decoded video signals, wherein each of the main decoded video signal and the sub-decoded video signal includes a plurality of frames (i.e., video frames). For example, in one embodiment, the first decoded video signal V1 is selected as the main decoded video signal, and the other decoded video signals V2~Vn are selected as the sub-decoded video signals. In another embodiment, the second decoded video signal V2 is selected as the main decoded video signal, and the other decoded video signals V1 and V3~Vn are selected as the sub-decoded video signals. It should be noted that the number of the selected sub-decoded video signals is adjustable.

Furthermore, the processing circuit 130 is coupled to the setting circuit 120, and arranged for performing an image processing operation upon the main decoded video signal (e.g., the first decoded video signal V1) and the sub-decoded video signal(s) (e.g., decoded video signals V2~Vn) to generate a processed video signal Vp. Additionally, the processing circuit 130 is further arranged for controlling frame rates of these decoded video signals V1~Vn. For example, if a frame rate of the main decoded video signal V1 is equal to 30 fps (frames per second) and a frame rate of the sub-decoded video signal V2 is equal to 60 fps, the processing circuit 130 needs to discard one frame of the sub-decoded video signal V2 every time when one frame of the main decoded video signal V1 is processed. Similarly, if a frame rate of the main decoded video signal V1 is equal to 30 fps and a frame rate of the sub-decoded video signal V2 is equal to 60 fps, the processing circuit 130 needs to repeat the frame of the sub-decoded video signal V2 every time when one frame of the main decoded video signal V1 is processed.

In addition, both of the buffers 140 and 150 are coupled to the processing circuit 130. Herein the buffer 140 may serve as an on-screen buffer for storing the processed video signal Vp being displayed or to be displayed and serve as an on-process buffer for storing the processed video signal Vp being mixed or to be mixed, cyclically. For example, the buffer 140 serves as an on-screen buffer/on-process buffer in a current stage, and serves as an on-process buffer/on-screen buffer in a next stage. The buffer 150 serves as the on-process buffer for storing the processed video signal Vp being mixed or to be mixed and serves as the on-screen buffer for storing the processed video signal Vp being displayed or to be displayed, cyclically. For example, the buffer 150 serves as an on-process buffer/on-screen buffer in a current stage, and serves as an on-screen buffer/on-process buffer in a next stage. Please note that the buffer 140 and the buffer 150 do not serve as the on-screen buffer simultaneously, and the buffer 140 and the buffer 150 do not serve as the on-process buffer simultaneously. That is to say, during a current stage, the buffer 140 serves as an on-screen buffer and the buffer 150 serves an on-process buffer; during a next stage, the buffer 150 serves as an on-screen buffer and the buffer 140 serves as an on-process buffer; and so on. The buffers 140 and 150 can be implemented by the ping-pong buffer technique, which is generally utilized by the persona skilled in the art and thus further description is omitted for brevity.

The display unit 160 is coupled to the first buffer 140 and the second buffer 150, for cyclically displaying the processed video signal Vp1 read from the buffer 140 and the processed video signal Vp2 read from the buffer 150 on the display device 170. It is noted that the display unit 160 displays the processed video signal Vp1 read from the buffer 140 and the processed video signal Vp2 read from the buffer 150 on the display device 170 according to a frame rate of the selected main decoded video signal.

Please note that the above-mentioned elements, including the decoding circuit 110, the setting circuit 120, the processing circuit, the buffers 140 and 150, and/or the display unit 160, may be implemented in a television or a Blu-ray disc (BD) player, but the present disclosure is not limited to this only. In addition, each of the decoding circuit 110, the setting circuit 120, and the processing circuit 130 may be implemented by software/firmware, hardware, or a combination thereof. Those skilled in the art should readily appreciate that various modifications of achieving the functions of the decoding circuit 110, the setting circuit 120, and the processing circuit 130 shown in FIG. 1 may be made without departing from the spirit of the present invention.

Figure 2:
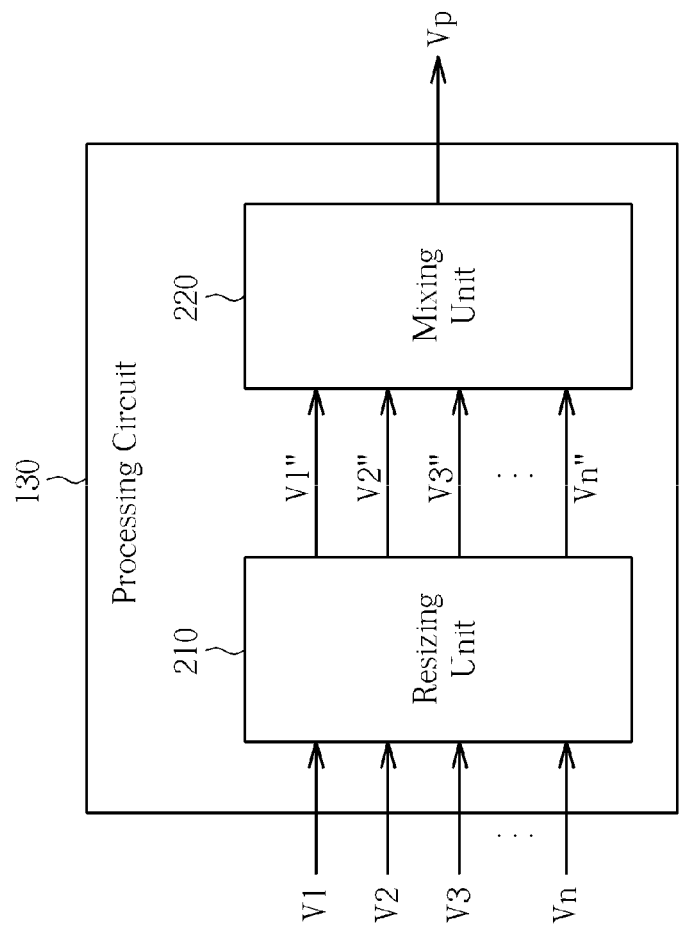
FIG. 2 is a diagram illustrating an exemplary implementation of the processing circuit shown in FIG. 1.
Figure 3:
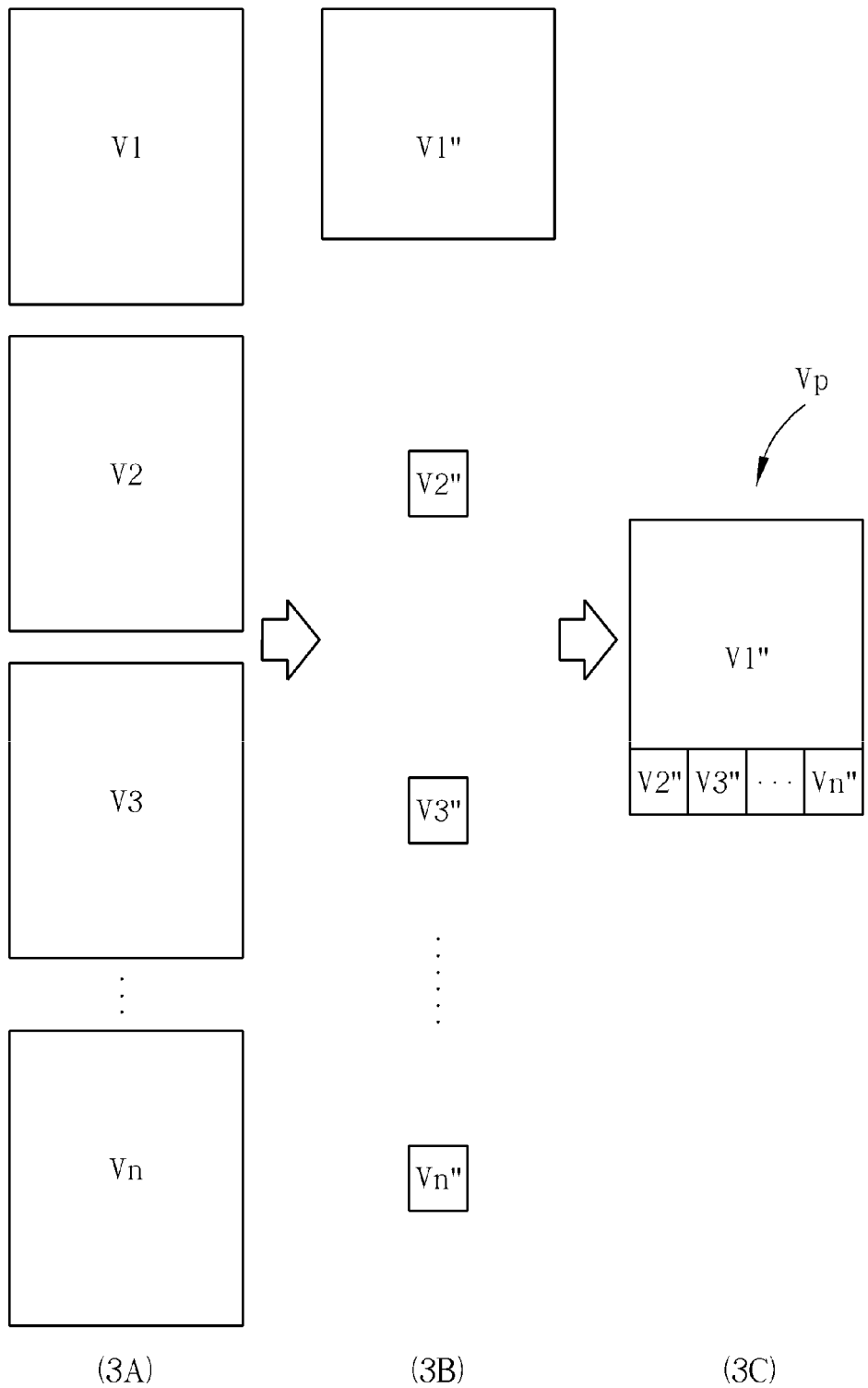
FIG. 3 (including sub-diagrams (3A), (3B), and (3C) is a diagram illustrating how the processing circuit shown in FIG. 2 performs an image processing operation upon the main decoded video signal and the at least one sub-decoded video signal to generate a processed video signal.

Please refer to FIG. 2 in conjunction with FIG. 3. FIG. 2 is a diagram illustrating an exemplary implementation of the processing circuit 130 shown in FIG. 1, and FIG. 3 (including sub-diagrams (3A), (3B), and (3C)) is a diagram illustrating how the processing circuit 130 shown in FIG. 2 performs an image processing operation upon a main decoded video signal and at least one sub-decoded video signal to generate a processed video signal. As shown in FIG. 2, the processing circuit 130 includes, but is not limited to, a resizing unit 210 and a mixing unit 220. The resizing unit 210 is arranged for performing a resizing operation upon a main decoded video signal (e.g., the first decoded video signal V1 selected by the preceding setting circuit 120) and at least one sub-decoded video signal (e.g., the decoded video signal V2~Vn selected by the preceding setting circuit 120) to generate a resized main decoded video signal (e.g., V1") corresponding to the main decoded video signal and at least one resized sub-decoded video signal (e.g., V2"~Vn") corresponding to the at least one sub-decoded video signal. The mixing unit 220 is coupled to the resizing unit 210, and arranged for performing a mixing operation upon the resized main decoded video signal (e.g., V1") and the at least one resized sub-decoded video signal (e.g., V2"~Vn") to generate the processed video signal Vp.

As shown in FIG. 3(A), each of the decoded video signal V1~Vn has a frame size equal to FS1. After performing the resizing operation upon the main decoded video signal (e.g., the first decoded video signal V1) and the at least one sub-decoded video signal (e.g., the decoded video signal V2~Vn), a frame size of the resized main decoded video signal V1" is equal to FS2 and each of the resized sub-decoded video signals V2"~Vn" has a frame size FS3. After the mixing operation is performed upon the resized main decoded video signal V1" and the resized sub-decoded video signals V2"~Vn", the processed video signal Vp having a frame size FS4 is generated accordingly. Please note that: the frame size FS2 is smaller than the frame size FS1 (i.e., FS2<FS1), and the frame size FS3 is smaller than the frame size FS2 (i.e., FS3<FS2). In addition, as all of the resized main decoded video signal and resized sub-decoded video signals are to be displayed simultaneously, the sum of the frame sizes of the resized main decoded video signal V1" and the resized sub-decoded video signals V2"~Vn" is smaller than or equal to the frame size FS4 of the processed video signal Vp, which can be expressed as: 1*FS2+M*FS3≤FS4;

where M presents the number of the selected sub-decoded video signals and in the embodiment above, and M is equal to (n−1).

Figure 4:
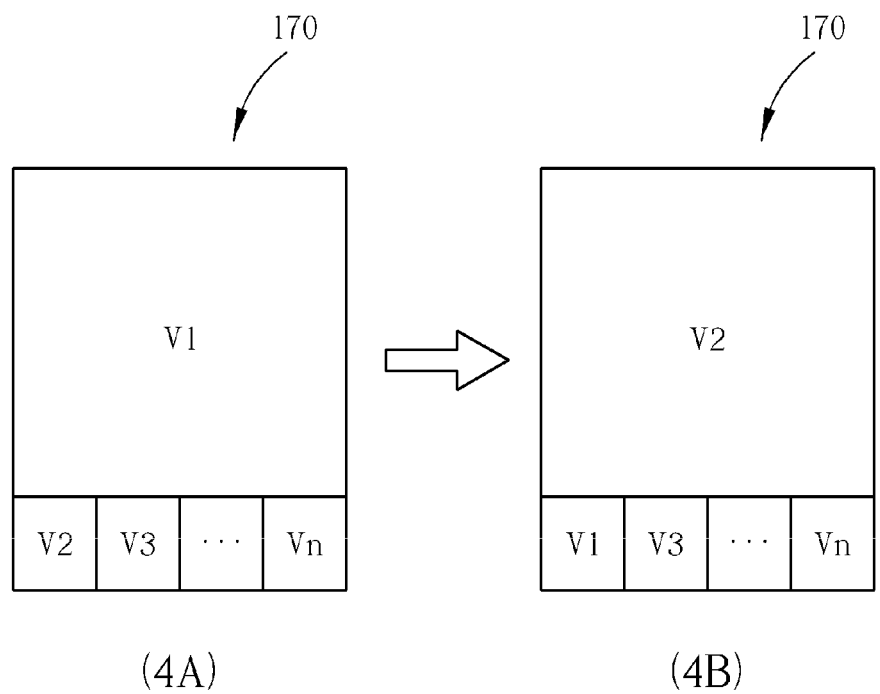
FIG. 4 (including sub-diagrams (4A) and (4B) is a diagram illustrating how to simultaneously display a plurality of decoded video signals on a display device according to an embodiment of the present disclosure.

FIG. 4 (including sub-diagrams (4(A)) and (4(B)) is a diagram illustrating how to simultaneously display a plurality of decoded video signals on a display device according to an embodiment of the present disclosure. As shown in FIG. 4(A), a plurality of decoded video signals V1~Vn, which form the processed video signal Vp, are simultaneously displayed on a display screen of the display device 170 shown in FIG. 1. As shown in FIG. 4(A), the first decoded video signal V1 is selected as the main decoded video signal, and the other decoded video signals V2~Vn are selected as the sub-decoded video signals. As shown in FIG. 4(B), the second decoded video signal V2 is selected as the main decoded video signal, and the other decoded video signals V1 and V3~Vn are selected as the sub-decoded video signals. Please note that, in FIG. 4(A), the processed video signal Vp is displayed on the display device 170 according to a frame rate of the first decoded video signal V1 (i.e., the main decoded video signal); however, in FIG. 4(B), the processed video signal Vp is displayed on the display device 170 according to a frame rate of the second decoded video signal V2 which is selected as the main decoded video signal now.

In the following embodiments, several examples are presented for illustrating how to adjust the display content of a plurality of decoded video signals displayed on a display device under different conditions.

Figure 5:
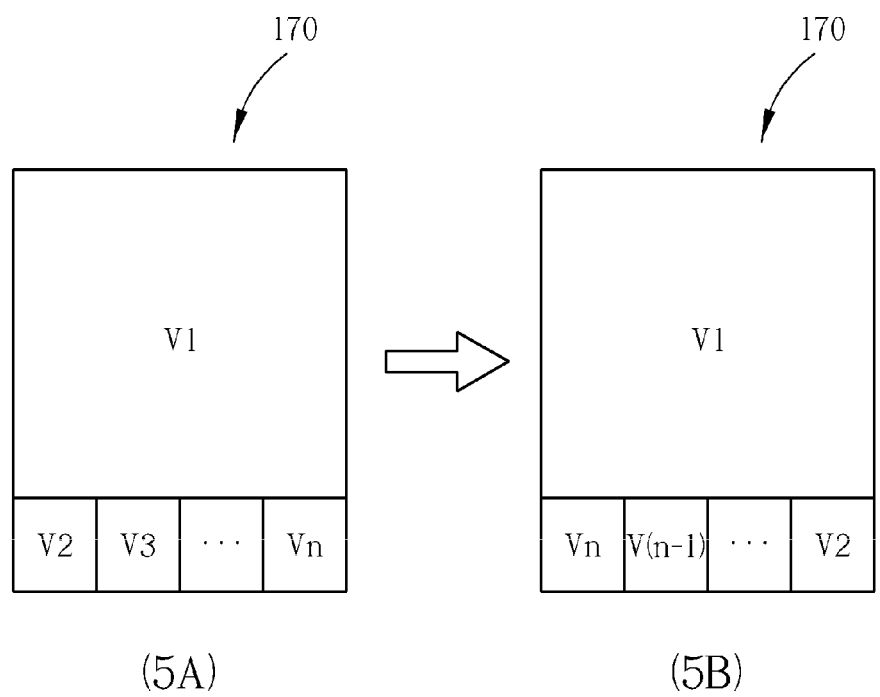
FIG. 5 (including sub-diagrams (5A) and (5B) is a diagram illustrating how to adjust the display content of a plurality of decoded video signals displayed on a display device according to a first embodiment of the present disclosure.

FIG. 5 (including sub-diagrams (5A) and (5B)) is a diagram illustrating how to adjust the display content of a plurality of decoded video signals displayed on a display device according to a first embodiment of the present disclosure. The difference between the examples respectively shown in sub-diagrams (A) and (B) is the arrangement of the display areas arranged for displaying the sub-decoded video signals V2~Vn. More specifically, the sub-decoded video signals V2~Vn, as shown in FIG. 5(A), are sequentially displayed on display areas of the display device 170 from left to right according to an order of V2→V3→ . . . →Vn; while the sub-decoded video signals V2~Vn, as shown in FIG. 5(B), are sequentially displayed on display areas of the display device 170 from left to right according to an order of Vn→V(n−1)→ . . . V3→V2.

Figure 6:
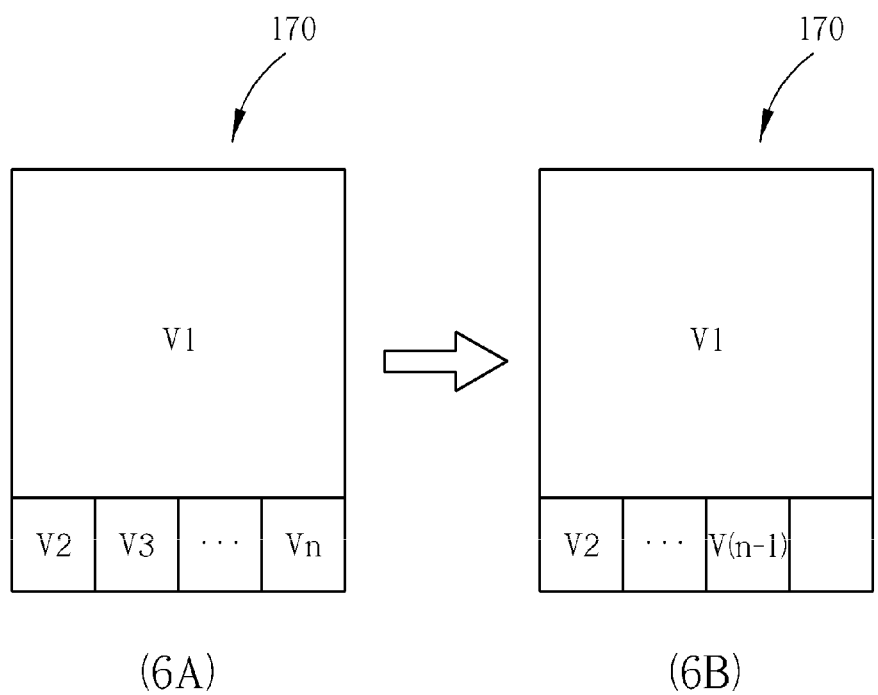
FIG. 6 (including sub-diagrams (6A) and (6B) is a diagram illustrating how to adjust the display content of a plurality of decoded video signals displayed on a display device according to a second embodiment of the present disclosure.

FIG. 6 (including sub-diagrams (6A) and (6B)) is a diagram illustrating how to adjust the display content of a plurality of decoded video signals displayed on a display device according to a second embodiment of the present disclosure. Under a condition where a specific sub-decoded video signal ends (e.g., the specific sub-decoded video signal carries no video data or the transmission status of the specific sub-decoded video signal is bad and thus the specific sub-decoded video signal is not available), the specific sub-decoded video signal is removed from displaying on the display device 170. For example, as shown in FIG. 6(A), the main decoded video signal V1 and the sub-decoded video signals V2~Vn are originally displayed on the display device 170. When the sub-decoded video signal Vn ends, the sub-decoded video signal Vn which having no video data to be displayed is removed from displaying on the display device 170, as is shown in FIG. 6(B).

Figure 7:
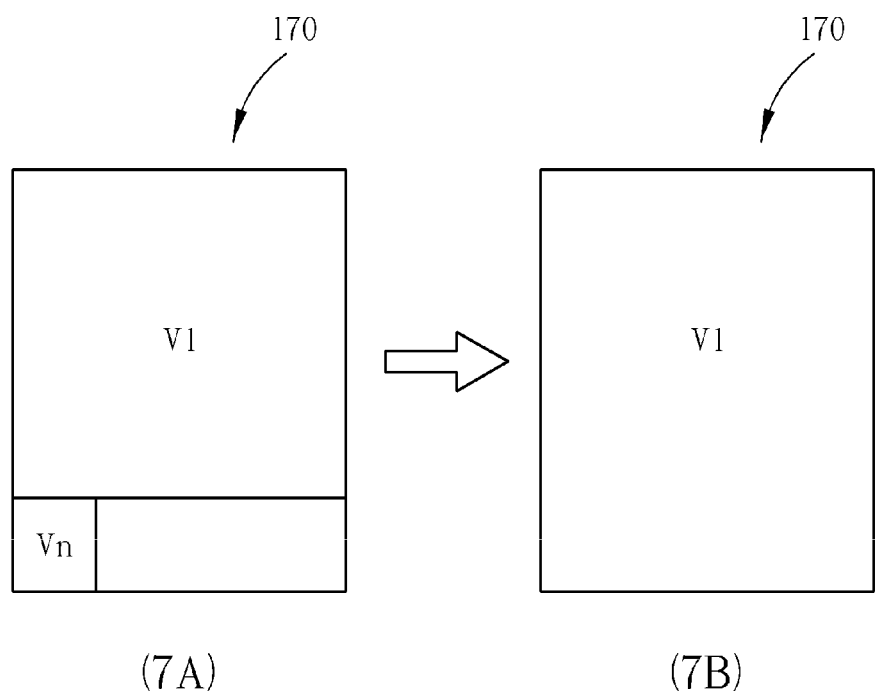
FIG. 7 (including sub-diagrams (7A) and (7B) is a diagram illustrating how to adjust the display content of a plurality of decoded video signals displayed on a display device according to a third embodiment of the present disclosure.

FIG. 7 (including sub-diagrams (7A) and (7B) is a diagram illustrating how to adjust the display content of a plurality of decoded video signals displayed on a display device according to a third embodiment of the present disclosure. Under a condition where all of the sub-decoded video signals end (e.g., each of the sub-decoded video signals carries no video data), the resizing operation performed upon the main decoded video signal is adjusted to update the main decoded video signal according to a resolution of the display device 170. For example, as shown in FIG. 7(A), only the main decoded video signal V1 and the sub-decoded video signal Vn are displayed on the display device 170. When all of the sub-decoded video signals end, the main decoded video signal V1 is resized according to a resolution of the display device 170. By way of example, but not limitation, the main decoded video signal V1 may be resized to the full screen of the display device 170.

Figure 8:
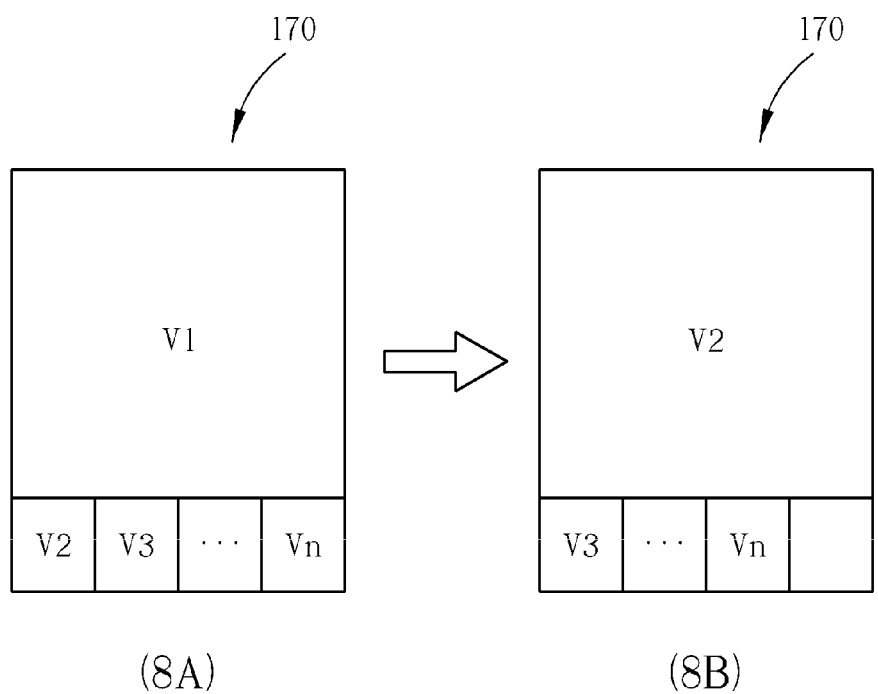
FIG. 8 (including sub-diagrams (8A) and (8B) is a diagram illustrating how to adjust the display content of a plurality of decoded video signals displayed on a display device according to a fourth embodiment of the present disclosure.

FIG. 8 (including sub-diagrams (8A) and (8B) is a diagram illustrating how to adjust the display content of a plurality of decoded video signals displayed on a display device according to a fourth embodiment of the present disclosure. Under a condition where the originally selected main decoded video signal ends, one decoded video signal is selected from the sub-decoded video signal(s) as a new main decoded video signal, or another decoded video signal is selected as the new main decoded video signal. For example, as shown in FIG. 8(A), the main decoded video signal V1 and the sub-decoded video signals V2~Vn are originally displayed on the display device 170. When the originally selected main decoded video signal V1 ends, the sub-decoded video signal V2 is selected as a new main decoded video signal and then displayed, as shown in FIG. 8(B).

Those skilled in the art should readily appreciate that various modifications of achieving a goal of adjusting the display content of a plurality of decoded video signals displayed on a display device under different conditions may be made without departing from the spirit of the present invention. There alternative designs all fall within the scope of the present invention.

Figure 9:
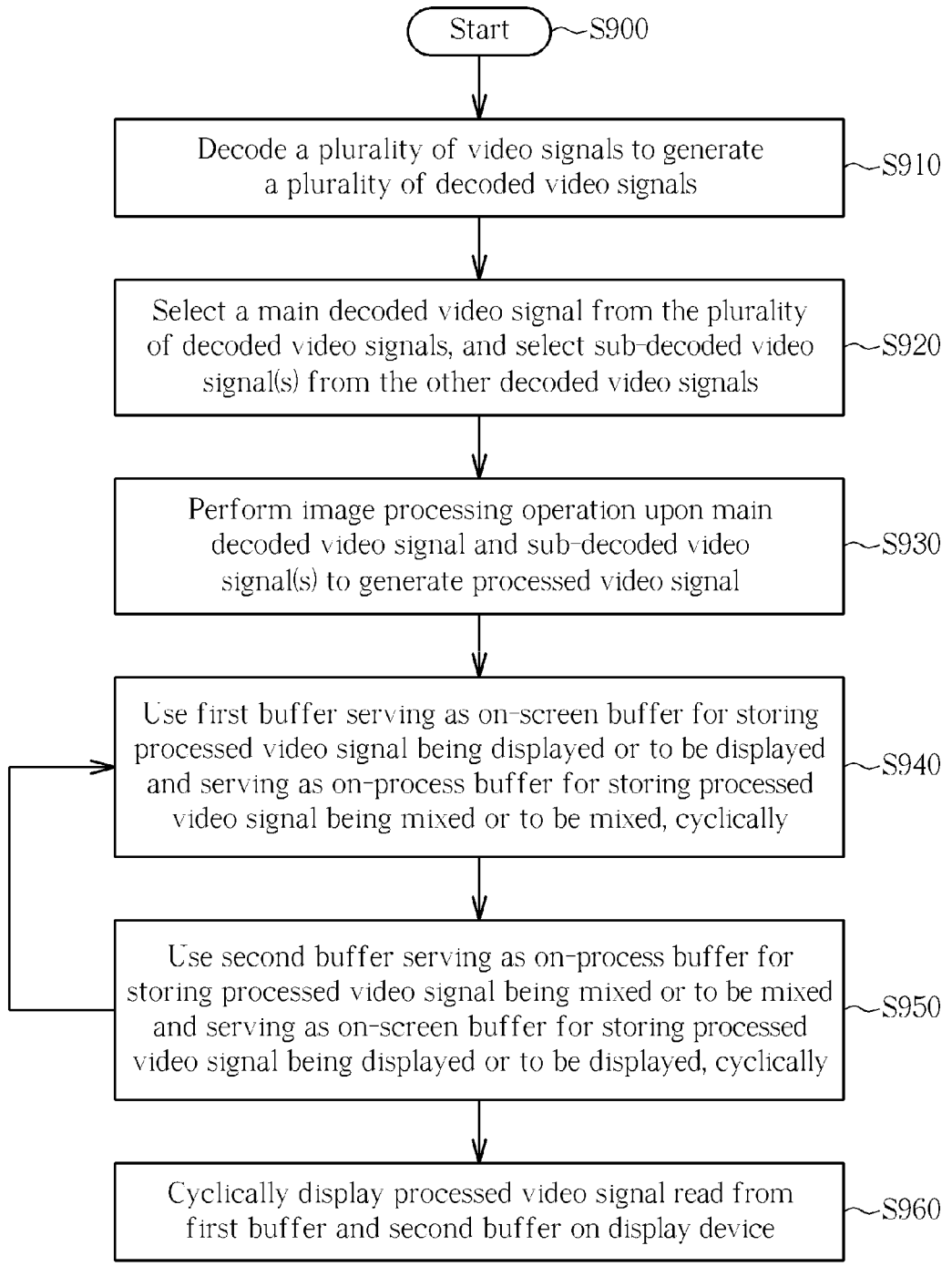
FIG. 9 is a flowchart illustrating a generalized method for simultaneously displaying a plurality of video signals on a display device according to an exemplary embodiment of the present disclosure.

FIG. 9 is a flowchart illustrating a generalized method for simultaneously displaying a plurality of video signals on a display device according to an exemplary embodiment of the present disclosure. Please note that the steps are not required to be executed in the exact order shown in FIG. 9, provided that the result is substantially the same. The generalized method includes the following steps:

Step S900: Start.

Step S910: Decode a plurality of video signals to generate a plurality of decoded video signals.

Step S920: Select a main decoded video signal from the plurality of decoded video signals, and select sub-decoded video signal(s) from the other decoded video signals.

Step S930: Perform an image processing operation upon the main decoded video signal and the sub-decoded video signal(s) to generate a processed video signal.

Step S940: Use a first buffer serving as an on-screen buffer for storing the processed video signal being displayed or to be displayed and serving as an on-process buffer for storing the processed video signal being mixed or to be mixed, cyclically.

Step S950: Use a second buffer serving as the on-process buffer for storing the processed video signal being mixed or to be mixed and serving as the on-screen buffer for storing the processed video signal being displayed or to be displayed, cyclically.

Step S960: Cyclically display the processed video signal read from the first buffer and the second buffer on a display device.

As a person skilled in the art can readily understand details of the steps in FIG. 9 after reading above paragraphs directed to the video processing apparatus 100 shown in FIG. 1, further description is omitted here for brevity. The step S910 may be executed by the decoding circuit 110, the step S920 may be executed by the setting circuit 120, the step S930 may be executed by the processing circuit 130, the steps S940 and S950 may be executed with the buffers 140 and 150, and the steps S960 may be executed by the display unit 160 and the display device 170. Please note that the step S960 may be executed by cyclically displaying the processed video signal read from the first buffer and the second buffer on the display device according to a frame rate of the main decoded video signal.

Please note that, the steps of the abovementioned flowchart are presented merely for illustrative purposes, and in no way should be considered to be limitations to the scope of the present invention. For example, the step S930 may further include several detailed steps. Please refer to FIG. 10, which is a flowchart illustrating the detailed steps of performing the image processing operation upon the main decoded video signal and the at least one sub-decoded video signal to generate a processed video signal (i.e. the step S930) shown in FIG. 9. The method includes, but is not limited to, the following steps:

Step S1010: Perform a resizing operation upon the main decoded video signal and the sub-decoded video signal(s) to generate a resized main decoded video signal and resized sub-decoded video signal(s).

Step S1020: Perform a mixing operation upon the resized main decoded video signal and the resized sub-decoded video signal(s) to generate the processed video signal.

Figure 10:
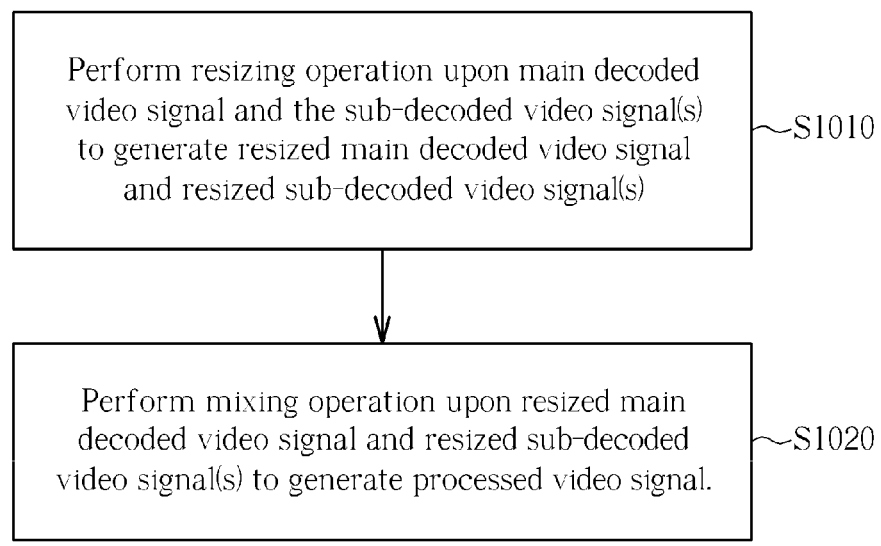
FIG. 10 is a flowchart illustrating the detailed steps of performing the image processing operation upon the main decoded video signal and the at least one sub-decoded video signal to generate a processed video signal shown in FIG. 9.

As a person skilled in the art can readily understand the details of the steps in FIG. 10 after reading above paragraphs directed to the resizing unit 210 and the mixing unit 220 of the processing circuit 130 shown in FIG. 2 and FIG. 3, further description is omitted here for brevity. Please note that the steps S1010 and S1020 may be modified in order to satisfy different conditions. As an illustration, under a condition where all of the resized sub-decoded video signals end, the resizing operation performed upon the main decoded video signal in the step S1010 may be altered to update the main decoded video signal according to a resolution of the display device. The step S1020 may be modified to perform the mixing operation upon the resized main decoded video signal and the plurality of resized sub-decoded video signals according to display areas of the resized main decoded video signal and the plurality of resized sub-decoded video signals and accordingly generates the processed video signal. Furthermore, as the modifications related to the steps S1010 and S1020 are also detailed in the abovementioned embodiments shown in FIG. 5 and FIG. 7, further description is omitted here for brevity.

Figure 11:
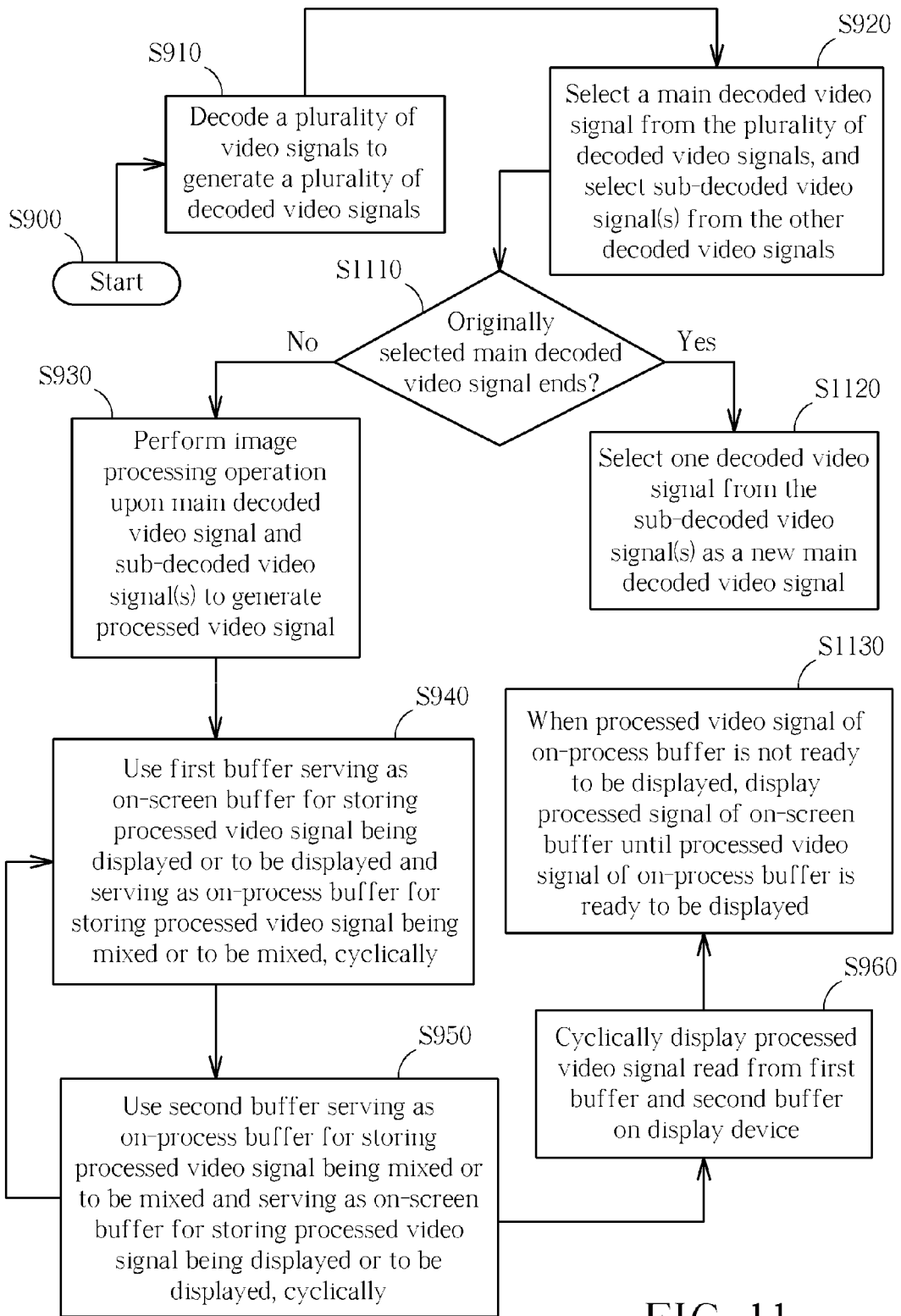
FIG. 11 is a flowchart illustrating a generalized method for simultaneously displaying a plurality of video signals on a display device according to another exemplary embodiment of the present disclosure.

FIG. 11 is a flowchart illustrating a generalized method for simultaneously displaying a plurality of video signals on a display device according to another exemplary embodiment of the present disclosure. The generalized method includes, but is not limited to, the following steps:

Step S900: Start.

Step S910: Decode a plurality of video signals to generate a plurality of decoded video signals.

Step S920: Select a main decoded video signal from the plurality of decoded video signals, and select sub-decoded video signal(s) from the other decoded video signals.

Step S1110: Determine whether the originally selected main decoded video signal ends. When the originally selected main decoded video signal ends, go to Step S1120; otherwise, go to Step S930.

Step S1120: Select one decoded video signal from the sub-decoded video signal(s) as a new main decoded video signal.

Step S930: Perform an image processing operation upon the main decoded video signal and the sub-decoded video signal(s) to generate a processed video signal.

Step S940: Use a first buffer serving as an on-screen buffer for storing the processed video signal being displayed or to be displayed and serving as an on-process buffer for storing the processed video signal being mixed or to be mixed, cyclically.

Step S950: Use a second buffer serving as the on-process buffer for storing the processed video signal being mixed or to be mixed and serving as the on-screen buffer for storing the processed video signal being displayed or to be displayed, cyclically.

Step S960: Cyclically display the processed video signal read from the first buffer and the second buffer on a display device.

Step S1130: When the processed video signal of the on-process buffer is not ready to be displayed, display the processed signal of the on-screen buffer until the processed video signal of the on-process buffer is ready to be displayed.

The steps shown in FIG. 11 are similar to that shown in FIG. 9, and the major difference between them is that the flowchart shown in FIG. 11 further includes a step for selecting a new main decoded video signal when the originally selected main decoded video signal ends (i.e., the steps S1110 and S1120) as well as a step for displaying the processed signal of the on-screen buffer until the processed video signal of the on-process buffer is ready to be displayed when the processed video signal of the on-process buffer is not ready to be displayed (i.e., the step S1130). Please note that the steps S1110 and S1120 are also detailed in the abovementioned embodiment shown in FIG. 8. Thus, further description is omitted here for brevity.

Please note that, the steps of the abovementioned flowcharts are presented merely for illustrative purposes, and in no way should be considered to be limitations of the scope of the present invention. Those skilled in the art should readily appreciate that the methods shown in FIG. 9, FIG. 10, and FIG. 11 may include other intermediate steps or several steps may be merged into a single step without departing from the spirit of the present invention.

In summary, exemplary embodiments of the present disclosure provide a video processing apparatus and a related method for simultaneously displaying a plurality of video signals on a display device. By adopting two buffers to serve as an on-screen buffer for storing the processed video signal being displayed or to be displayed and serve as an on-process buffer for storing the processed video signal being mixed or to be mixed by turns, the video processing apparatus is able to simultaneously display a plurality of video signals on the display device. Furthermore, in order to satisfy different conditions, the display content of the plurality of decoded video signals on the display device can be adjusted, which also belongs to the scope of the present disclosure.

Those skilled in the art will readily observe that numerous modifications and alterations of the device and method may be made while retaining the teachings of the invention.

The invention claimed is:

1. A video processing apparatus, comprising:
    a decoding circuit, for decoding a plurality of video signals to generate a plurality of decoded video signals;
    a setting circuit, coupled to the decoding circuit, for selecting a main decoded video signal from the plurality of decoded video signals, and selecting at least one sub-decoded video signal from the other decoded video signals, wherein each of the main decoded video signal and the sub-decoded video signal includes a plurality of frames;
    a processing circuit, for performing an image processing operation upon the main decoded video signal and the at least one sub-decoded video signal to generate a processed video signal;
    a first buffer, coupled to the processing circuit, the first buffer serving as an on-screen buffer for storing the processed video signal being displayed or to be displayed and serving as an on-process buffer for storing the processed video signal being mixed or to be mixed, cyclically;
    a second buffer, coupled to the processing circuit, the second buffer serving as the on-process buffer for storing the processed video signal being mixed or to be mixed and serving as the on-screen buffer for storing the processed video signal being displayed or to be displayed, cyclically, wherein the first buffer and the second buffer do not serve as the on-screen buffer simultaneously, and the first buffer and the second buffer do not serve as the on-process buffer simultaneously; and
    a display unit, coupled to the first buffer and the second buffer, for cyclically displaying the processed video signal read from the first buffer and the second buffer on a display device.

2. The video processing apparatus of claim 1, wherein the display unit cyclically displays the processed video signal read from the first buffer and the second buffer on the display device according to a frame rate of the main decoded video signal.

3. The video processing apparatus of claim 1, wherein the processing circuit comprises:
    a resizing unit, for performing a resizing operation upon the main decoded video signal and the at least one sub-decoded video signal to generate a resized main decoded video signal and at least one resized sub-decoded video signal; and
    a mixing unit, coupled to the resizing unit, for performing a mixing operation upon the resized main decoded video signal and the at least one resized sub-decoded video signal to generate the processed video signal.

4. The video processing apparatus of claim 3, wherein the at least one of resized sub-decoded video signal comprises a plurality of resized sub-decoded video signals, and the mixing unit performs the mixing operation upon the resized main decoded video signal and the plurality of resized sub-decoded video signals according to display areas of the resized main decoded video signal and the plurality of resized sub-decoded video signals and accordingly generates the processed video signal.

5. The video processing apparatus of claim 3, wherein when all of the at least one resized sub-decoded video signal ends, the resizing unit performs the resizing operation upon the main decoded video signal to update the main decoded video signal according to a resolution of the display device.

6. The video processing apparatus of claim 1, wherein when the main decoded video signal originally selected by the setting circuit ends, the setting circuit further selects one decoded video signal from the at least one sub-decoded video signal as a new main decoded video signal.

7. The video processing apparatus of claim 6, wherein the display unit cyclically displays the processed video signal read from the first buffer and the second buffer on the display device according to a frame rate of the new main decoded video signal.

8. The video processing apparatus of claim 1, wherein when the processed video signal of the on-process buffer is not ready to be displayed, the display unit displays the processed signal of the on-screen buffer until the processed video signal of the on-process buffer is ready to be displayed.

9. A method for simultaneously displaying a plurality of video signals on a display device, comprising:
    decoding the plurality of video signals to generate a plurality of decoded video signals;
    selecting a main decoded video signal from the plurality of decoded video signals, and selecting at least one sub-decoded video signal from the other decoded video signals, wherein each of the main decoded video signal and the sub-decoded video signal includes a plurality of frames;
    performing an image processing operation upon the main decoded video signal and the at least one sub-decoded video signal to generate a processed video signal;
    using a first buffer serving as an on-screen buffer for storing the processed video signal being displayed or to be displayed and serving as an on-process buffer for storing the processed video signal being mixed or to be mixed, cyclically;
    using a second buffer serving as the on-process buffer for storing the processed video signal being mixed or to be mixed and serving as the on-screen buffer for storing the processed video signal being displayed or to be displayed, cyclically, wherein the first buffer and the second buffer do not serve as the on-screen buffer simultaneously, and the first buffer and the second buffer do not serve as the on-process buffer simultaneously; and
    cyclically displaying the processed video signal read from the first buffer and the second buffer on the display device.

10. The method of claim 9, wherein the step of cyclically displaying the processed video signal read from the first buffer and the second buffer on the display device comprises:
    cyclically displaying the processed video signal read from the first buffer and the second buffer on the display device according to a frame rate of the main decoded video signal.

11. The method of claim 9, wherein the step of performing the image processing operation upon the main decoded video signal and the at least one sub-decoded video signal to generate the processed video signal comprises:

performing a resizing operation upon the main decoded video signal and the at least one sub-decoded video signal to generate a resized main decoded video signal and at least one resized sub-decoded video signal; and performing a mixing operation upon the resized main decoded video signal and the at least one resized sub-decoded video signal to generate the processed video signal.

12. The method of claim 11, wherein the at least one of resized sub-decoded video signal comprises a plurality of resized sub-decoded video signals, and the step of performing a mixing operation upon the resized main decoded video signal and the at least one resized sub-decoded video signal to generate the processed video signal comprises:

performing the mixing operation upon the resized main decoded video signal and the plurality of resized sub-decoded video signals according to display areas of the resized main decoded video signal and the plurality of resized sub-decoded video signals and accordingly generates the processed video signal.

13. The method of claim 11, further comprising:

when all of the at least one resized sub-decoded video signal ends, performing the resizing operation upon the main decoded video signal to update the main decoded video signal according to a resolution of the display device.

14. The method of claim 9, further comprising:

when the originally selected main decoded video signal ends, selecting one decoded video signal from the at least one sub-decoded video signal as a new main decoded video signal.

15. The method of claim 14, wherein the step of cyclically displaying the processed video signal read from the first buffer and the second buffer on the display device comprises:

cyclically displaying the processed video signal read from the first buffer and the second buffer on the display device according to a frame rate of the new main decoded video signal.

16. The method of claim 9, further comprising:

when the processed video signal of the on-process buffer is not ready to be displayed, displaying the processed signal of the on-screen buffer until the processed video signal of the on-process buffer is ready to be displayed.

* * * * *